Patented June 20, 1939

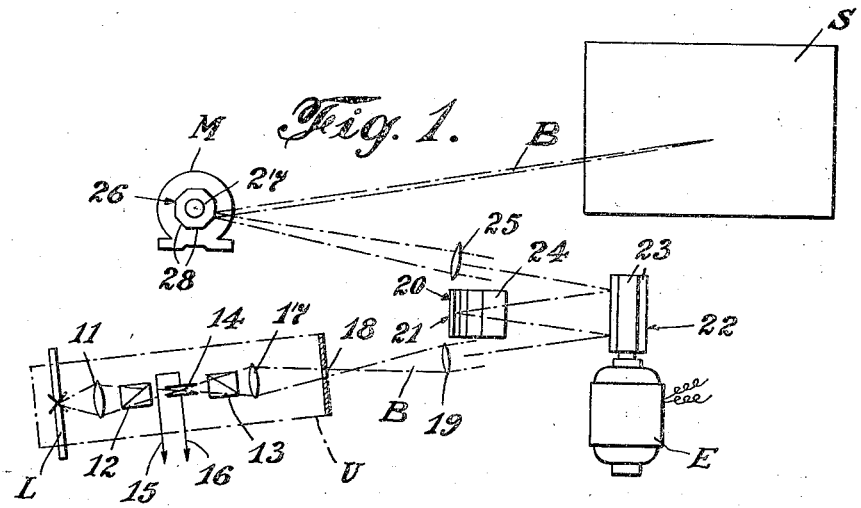
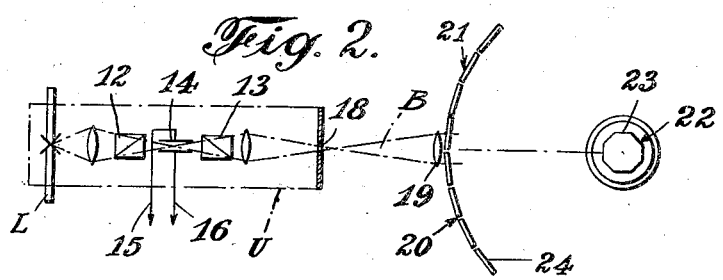
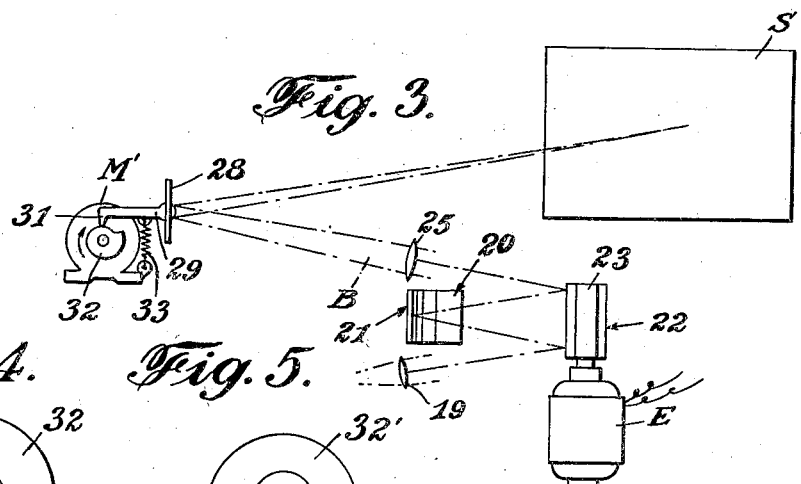
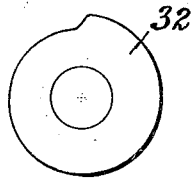
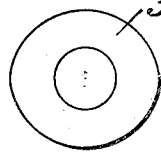

2,163,548

UNITED STATES PATENT OFFICE 2,163,548

SYSTEM FOR TELEVISION SCANNING

Stewart L. Clothier, Irvington, and Harold C. Hogencamp, Maplewood, N. J., assignors to Kolorama Laboratories, Inc., Newark, N. J., a corporation of New Jersey Application July 16, 1936, Serial No. 90,994

7 Claims. (Cl. 178—7.6)

This invention relates to television and more particularly to mechanical scanning methods and apparatus therefor.

In one form of mechanical scanning apparatus heretofore employed, use has been made of a stationary drum segment the inner periphery of which is provided with a plurality of plane reflecting surfaces. A rotating scanner is positioned substantially at the axis of the segment in operative relation to a source of modulated light in such a manner as to direct a light beam from the modulated source upon the successive reflecting surfaces mounted about the inner periphery of the drum segment and so as to direct the beam reflected from the mirror surfaces upon a screen. The rotating scanner usually comprises a multifaced body the outer surfaces of which are mirrored. In order to produce scanning along both coordinates of the screen the successive mirrored surfaces about the inner periphery of the stationary segment as well as those about the rotating scanner having been tilted away from the axis at gradually increasing angles. With this type of apparatus, one frame is scanned during each rotation of the scanner and the number of lines available is definitely limited to the product of the number of mirrors about the segment and the number of mirrors about the rotating scanner. In order to increase the number of lines so as to obtain better definition, it has been necessary to increase the number of surfaces about either or both thhe segment and the rotating scanner. Since the size of the mirrors cannot be reduced in size without a loss in efficiency, increasing the number of mirrors results in an increase of the overall dimensions of the apparatus. Accordingly, in such prior devices, the number of lines available in any case is fixed by the practical limitations restricting the size of the apparatus. Furthermore, the tilting of the mirrors away from the axis requires delicate adjustment and complicated mounting means in order to obtain accurate scanning.

In the present system, the foregoing disadvantages have been overcome by the provision of a novel scanning system wherein the number of lines available in scanning may be increased without increasing the size of the apparatus and wherein the structure may be simplified by obviating the necessity for mirrors tilted at gradually increasing angles from the axis.

The principal objects of the present invention are: to provide a simplified method of television scanning; to provide new and improved mechanism for television scanning in the type of apparatus employing a stationary mirrored segment in conjunction with a rotating mirrored scanner; and to provide new and improved structure for increasing the definition obtainable with a given segment. These and other objects will be more readily understood from the following specification in conjunction with the accompanying drawing, in which:

Fig. 1 is a diagrammatic arrangement illustrating one form of the present invention in conjunction with a source of modulated light;

Fig. 2 is a plan view of the stationary line scanner and the rotatable line scanner showing their optical relation to the modulated light beam;

Fig. 3 is a diagrammatical arrangement view similar to Fig. 1 showing a modified form of frame scanner.

Figs. 4 and 5 are details showing forms of cams which may be employed with the frame scanner shown in Fig. 3.

Generally speaking, the invention contemplates employing a stationary circular drum segment the inner periphery of which is provided with a plurality of plane reflecting surfaces constituting stationary line-scanning elements, and a rotatable line scanner comprising a mirrored prism mounted at or near the axis of the circular segment. The surfaces about the segment as well as those about the rotatable scanner are positioned parallel to the axis so that none of the mirrors are tilted with respect to one another save for the natural angular displacement of the mirrors about the respective peripheries. Frame scanning, or periodic displacement of the line scans, is produced by a separate scanning mechanism mounted in optical relation to the segment and to the rotatable line scanner. The frame scanner preferably consists of one or more reflecting surfaces movable about an axis perpendicularly positioned with respect to the axis of the rotatable line scanner.

Referring again to the drawings and more particularly to Figs. 1 and 2, the invention comprises a light source L, such as a carbon arc or incandescent filament, suitably positioned with respect to a light modulating unit U. The unit U may be of any conventional design capable of modulating the light beam B according to electrical impulses received from the television transmitting station. In the unit herein diagrammatically illustrated, use is made of a lens 11 positioned in the path of the beam B in optical relation to the light source L. A pair of Nicol prisms 12 and 13 having a Kerr cell 14 interposed between them modulate the light according to the electrical potential applied by the television receiver to the Kerr cell terminals 15 and 16. A second lens 17 interposed in the path of the beam B adjacent to the end of the unit U opposite the light source L concentrates the beam upon an aperture 18.

A lens 19 is positioned adjacent to the periphery of a stationary segment 20 forming part of the fixed line scanner 21, and is spaced from the aperture 18 a distance substantially equivalent to the focal length of the lens so as to resolve the beam B into a cylindrical pencil of light. A rotatable line scanner 22 is positioned substantially at the axis of the circular segment and comprises a multi-faced elongated body preferably of prismatic shape, the bounding planes 23 of which are silvered or otherwise provided with a mirrored surface. Each plane 23 is of sufficient width to receive the pencil of light B after passing through the lens 19. A prime mover such as a synchronous motor E turns the rotatable line scanner 22 at a predetermined speed.

The fixed line scanner 21 comprises a plurality of line scanning elements consisting preferably of a series of mirrors 24 positioned about the inner periphery of the circular segment 20. The respective mirrors 23 and 24 are all preferably mounted parallel to and equidistant from the axis of the rotatable line scanner 22. Preferably the arc subtended by the segment of the fixed line scanner is equivalent to twice the arc subtended by one surface 23 upon the rotatable line scanner 22. For example, if the rotatable line scanner 22 is bounded by twelve mirrored planes 23 each plane subtends an arc of 30°, and the fixed line scanner 21 preferably subtends an arc of substantially 60°. As the number of surfaces about the rotatable line scanner 22 decreases, the arc of the segment increases, until in the extreme condition, as when two surfaces are employed on the rotatable line scanner, the fixed line scanner extends through 360° and comprises a complete annulus. The light modulating unit U is angularly positioned or tilted with respect to the axis of the rotatable line scanner, as shown in Fig. 1, so that the beam B may be intercepted by the lower portion of the scanner 22 and reflected upon approximately the midsection of the fixed line scanner 21 in such a way as to be reflected therefrom back upon the same surface of the scanner 22 but at the top portion thereof.

The beam B after being reflected from the upper portion of the scanner 22 passes through a projection lens 25 upon a frame scanner 26 from which it is reflected upon a screen S. The lens 25 converges the beam B to substantially a point of light upon the screen S, which point of light represents an image of the aperture 18. The frame scanner 26 comprises a drum or prism 27, the outer periphery of which is provided with a plurality of mirrored surfaces 28 each of which is parallel to and equidistant from the axis of rotation. A motor M is provided to rotate the drum 27 at the desired frame scanning speed about an axis positioned substantially perpendicular to the axis of the line scanner. For example, if the drum 27 is provided with eight surfaces and it is desired to scan the screen at twenty-four frames per second, motion is imparted to the frame scanner so as to produce rotation thereof at the rate of three revolutions per second.

In the operation of the device shown in Figs. 1 and 2, the light source L is properly adjusted with respect to the various elements comprising the light modulating unit U so that the beam B after passing through the lens 19 comprises a pencil of light having substantially parallel sides, modulated according to the impulses received from the television transmitter. As the rotatable line scanner 22 revolves through an arc subtended by one surface 23, the beam B which is reflected therefrom, is swept arcuately about the entire inner periphery of the fixed line scanner 21, successively intercepting the respective mirrored surfaces 24. During this portion of the cycle, the apparatus scans a number of lines equal to the total number of mirrors 24, and the procedure is repeated until the desired number of lines for an entire frame is scanned. Meanwhile, the beam B, after leaving the top portion of the scanner 22 and passing through the lens 25 is scanned by the frame scanner 26 in a direction perpendicular to the direction of line scanning so as to produce frame scanning. As the scanners 22 and 26 rotate, the modulated point of light successively scans every portion of the screen S.

Since a separate frame scanner 26 is employed which may operate independently of the rotatable line scanner 22 it is no longer necessary as heretofore that the number of available lines be restricted to the product of the number of surfaces about the fixed line scanner 21 and the number of surfaces about the rotatable line scanner 22. In order to increase the number of lines, therefore, it is simply necessary to increase the speed of rotation of the motor E while the motor M may be maintained, if desired, at constant speed preferably such as to produce twenty-four separate frames each second. It is to be understood, however, that the motors E and M must at all times rotate at such speed as to produce the same number of line and frame scans respectively as employed at the television transmitting station.

In the form of the invention shown in Fig. 3, a modified form of frame scanner is employed. Since the other parts of the apparatus are identical with those previously described, the same reference numerals will be used to designate similar parts. In the modified structure the frame scanner 26 comprises a plane mirror 28 mounted for oscillatory movement about an axis transversely positioned with respect to the axis of the scanner 22. This mirror which may be made of glass or metal is preferably a first surface reflector and the pivot preferably lies in the plane of the reflecting surface. A lever 29 secured at one end to the mirror 28 is provided at its opposite end with a cam follower 31. A cam 32, shown in an enlarged scale in Fig. 4, is rotatably mounted in any convenient manner so as to engage the follower 31. A spring 33 or other resilient means connects with the lever 29 and constantly urges the follower 31 into contact with the cam surface. Rotation of the cam in the direction indicated by an arrow is provided by means of a motor M'. Although the cam 32 is herein shown as one providing constant angular velocity in one direction throughout a major portion of the cycle and a quick-return motion of the mirror to its initial position during a relatively short portion of the cycle, it is to be understood that various other types of cams may be employed to oscillate the frame-scanning mirror 28 according to a predetermined motion. For example, a cam 32' of the general type illustrated in Fig. 5 may be employed to oscillate the mirror 28 in one direction during the scanning of one frame, and in the opposite direction during the scanning of the successive frame. The cam is rotated so as to produce the desired number of frame scans per second. With the cam illustrated in Fig. 4 the motor shaft rotates at 1440 R. P. M in order to produce twenty-four frames per second, whereas with the cam shown in Fig. 5 only 720 R. P. M. are required.

Various other modifications of the foregoing apparatus will readily suggest themselves to those skilled in the art and it is to be understood that the embodiments herein described are representative merely of preferred forms of the invention and are in no sense to be construed as limiting the scope thereof as we contemplate any structure properly defined in the appended claims.

We claim:

1. Television scanning apparatus comprising the combination with a beam of modulated light, of a line scanner, and a frame scanner; said line scanner including a stationary circular drum segment having reflecting surfaces about its inner periphery, and a rotatable mirrored prism coaxial with said segment; said frame scanner comprising a reflecting surface movable about an axis spaced from and substantially perpendicular to the axis of said segment and means for oscillating said reflecting surface about its axis.

2. Television scanning apparatus comprising the combination with a beam of modulated light, of a line scanner, and a frame scanner; said line scanner including a stationary circular drum segment having plane reflecting surfaces about its periphery each of which is parallel to the axis of said segment, and a rotatable prism substantially coaxial with said segment and bounded by plane reflecting surfaces each of which is parallel to the axis of said prism; said frame scanner comprising an oscillatable plane mirror movable about an axis spaced from and substantially perpendicular to the axis of said segment and means for oscillating said plane mirror.

3. Television scanning apparatus comprising the combination with a screen, a source of light, means for resolving a portion of said source into a beam, and means for modulating said beam; of a line scanner including a rotatable mirrored prism for intercepting the modulated beam and a fixed stationary circular drum segment mounted coaxial with said prism and having a plurality of mirror surfaces about the inner periphery for successively receiving the beam from and reflecting the beam back upon said rotatable mirrored prism; and a frame scanner including an oscillatory mirror movable about an axis spaced from and transverse of the axis of said rotatable mirrored prism, said frame scanner receiving the beam reflected from said mirrored prism and directing it upon said screen.

4. Apparatus according to claim 3 wherein said transverse axis is in the plane of said mirror.

5. Apparatus according to claim 3 wherein said frame scanner includes a rotating cam for oscillating said mirror.

6. The method of television scanning which comprises directing a modulated light beam upon a reflecting surface, successively moving the beam through an arc, progressively intercepting the reflected beam while confining the same within an arcuate boundary and redirecting the same upon the mirrored surface, and reflecting upon a screen the resultant light beam while oscillating the same in a direction normal to the first mentioned direction of movement whereby frame and line scanning are accomplished.

7. Method according to claim 6 wherein the beam is oscillated in such a manner that it moves in the same direction during the scanning of alternate frames and in opposite directions during the scanning of successive frames.

STEWART L. CLOTHIER.
HAROLD C. HOGENCAMP.